US012637930B2

(12) United States Patent
Patiño et al.

(10) Patent No.: US 12,637,930 B2
(45) Date of Patent: May 26, 2026

(54) WATER/GAS RATIO REDUCER COMPOUNDS

(71) Applicant: PETRORAZA SAS, Antioquia (CO)

(72) Inventors: Jose Edgar Patiño, Antioquia (CO); Natalia Andrea Ospina, Envigado (CO)

(73) Assignee: PETRORAZA SAS, Sabaneta (CO)

( * ) Notice: Subject to any disclaimer, the term of this patent is extended or adjusted under 35 U.S.C. 154(b) by 0 days.

(21) Appl. No.: 19/180,529

(22) Filed: Apr. 16, 2025

(65) Prior Publication Data

US 2025/0327389 A1      Oct. 23, 2025

Related U.S. Application Data

(60) Provisional application No. 63/635,175, filed on Apr. 17, 2024.

(51) Int. Cl.
| | |
|---|---|
| *C09K 8/16* | (2006.01) |
| *C09K 11/65* | (2006.01) |
| *C09K 11/87* | (2006.01) |
| *E21B 21/06* | (2006.01) |
| *E21B 43/16* | (2006.01) |
| (Continued) | |

(52) U.S. Cl.
CPC ................ *E21B 43/16* (2013.01); *C09K 8/16* (2013.01); *C09K 11/65* (2013.01); *C09K 11/87* (2013.01); *E21B 21/062* (2013.01); *B82Y 20/00* (2013.01); *B82Y 40/00* (2013.01); *C09K 2208/10* (2013.01); *C09K 2208/12* (2013.01)

(58) Field of Classification Search
CPC ....................................................... C09K 8/58
See application file for complete search history.

(56) References Cited

U.S. PATENT DOCUMENTS

| | | | |
|---|---|---|---|
| 5,342,530 | A | 8/1994 | Aften et al. |
| 5,771,971 | A | 6/1998 | Horton et al. |
| | | (Continued) | |

FOREIGN PATENT DOCUMENTS

| | | |
|---|---|---|
| CN | 110746956 B | 2/2020 |
| CN | N116332300 A | 6/2023 |
| WO | 2006013597 A1 | 2/2006 |

OTHER PUBLICATIONS

Effect of nanoparticles on clay swelling and migration; Sameni. et al.; Egyptian Journal of Petroleum (2015) 24, 429-437.

(Continued)

*Primary Examiner* — William D Hutton, Jr.
*Assistant Examiner* — Avi T Skaist

(57) ABSTRACT

Novel water/gas ratio reducer compounds comprising metal-doped carbon quantum dots, methods of their manufacture, sandstone and limestone gas well compositions containing the water/gas ratio reducer compounds and methods of their use are disclosed. The novel water/gas ratio reducer compounds are useful, inter alia, to decrease Kw/Kg ratio for the reservoir output, reduce the water permeability in the reservoir and/or increase gas permeability in the reservoir use, increase production rate, to increase total output from the reservoir, are more environmentally acceptable, employable at much lower concentrations, are reusable, may be used in a wider range of gas well drilling fluids including, for example, seawater-based drilling fluids and/or more cost-effective in use.

23 Claims, 4 Drawing Sheets

Fluorescence spectroscopy of the quantum dots

(51) Int. Cl.
    *B82Y 20/00*        (2011.01)
    *B82Y 40/00*        (2011.01)

(56) References Cited

U.S. PATENT DOCUMENTS

| | | | |
|---|---|---|---|
| 7,915,202 | B2 | 3/2011 | Smith et al. |
| 10,155,899 | B2 * | 12/2018 | Agrawal .................. C09K 8/58 |
| 10,655,056 | B2 | 5/2020 | McDaniel et al. |
| 11,608,467 | B2 | 3/2023 | Alkhalaf et al. |
| 12,116,515 | B1 * | 10/2024 | Khan ...................... C01B 32/15 |
| 2009/0131280 | A1 | 5/2009 | Frederici et al. |
| 2011/0053763 | A1 | 3/2011 | Verdier et al. |
| 2023/0002664 | A1 | 1/2023 | Chavan et al. |
| 2024/0043738 | A1 | 2/2024 | Dupont et al. |

OTHER PUBLICATIONS

Clay Minerals—Mineralogy and Phenomenon of Clay Swelling in Oil & Gas Industry; Karpinski, et al.; Advances in Materials Science, vol. 15, No. 1 (43), Mar. 2015, pp. 37-55.

An interface-analyzing technique to evaluate the heavy oil swelling in presence of nickel oxide nanoparticles; Yousef Kazemzadeh, et al.; Journal of Molecular Liquids 211 (2015) 553-559.

Recent Developments in the Synthesis of Supported Catalysts; Munnik, et al.; Chem. Rev. 2015, 115, 6687-6718.

Clay Swelling: A Critical Review of 50 Years of Research; Moghadasi, et al.; OGPD 2017; found at: https://www.researchgate.net/publication/349608645.

Management of Implementation of Nanotechnology in Upstream Oil Industry: An Analytic Hierarchy Process Analysis; Pourafshary, et al.; Journal of Energy Resources Technology Copyright VC 2018 by ASME May 2018, vol. 140, pp. 1-7.

Effect of nanoparticles on the modifications of drilling fluids properties: A review of recent advances; Rafati, et al.; Journal of Petroleum Science and Engineering 161 (2018) 61-76.

The Effect of Nano Drilling Fluids on Reduction of Clay Swelling; Noah, et al.; Int J Nanoparticles Nanotech 2019, 5:024, pp. 1-17.

Evaluation of Clay Hydration and Swelling Inhibition Using Quaternary Ammonium Dicationic Surfactant with Phenyl Linker; Murtaza, et al.; Molecules 2020, 25, 4333.

A review on clay chemistry, characterization and shale inhibitors for A review on clay chemistry, characterization and shale inhibitors for water-based drilling fluids; Muhammed, et al.; Journal of Petroleum Science and Engineering 206 (2021) 109043.

Reservoir Formation Damage; Reasons and Mitigation: A Case Study of the Cambrian-Ordovician Nubian 'C' Sandstone Gas and Oil Reservoir from the Gulf of Suez Rift Basin; Radwan, et al.; Arabian Journal for Science and Engineering Aug. 2021 at: https://www.researchgate.net/publication/353965349.

Nanoparticles in drilling fluid: A review of the state-of-the-art; Goshtasp Cheraghian; Journal of Materials Research and technology 2021; 13:37-753.

Clay Swelling: Role of Cations in Stabilizing/Destabilizing Mechanisms; Chen, et al.; ACS Omega 2022, 7, 3185-3191.

Synergistic Effect of Nanoinhibitive Drilling Fluid on the Shale Swelling Performance at High Temperature and High Pressure; Ali, et al.; Energy Fuels 2022, 36, 1996-2006.

Recent Advancements in Metal and Non-Metal Mixed-Doped Carbon Quantum Dots: Synthesis and Emerging Potential Applications; Akram, et al.; Nanomaterials 2023, 13, 2336.

Two-Dimensionally Ordered Carbon Array Nanostructures with Atomically Dispersed Nickel for Sensitive Nonenzymatic Detection of Glucose; Qi, et al.; ACS Appl. Nano Mater. 2023, 6, 19827-19836.

Experimental evaluation of bentonite clay swelling and inhibition effect of nanoparticles; Kianersi, et al.; Environmental Earth Sciences (2023) 82:526, pp. 1-12.

Effect of Nanoparticles on Clay Stability in Water: Implication for Water Based Drilling Mud; Ogolo, et al.; Romanian Journal of Petroleum & Gas Technology vol. IV (LXXV) • No. Jan. 2023, pp. 39-48 (Feb. 2023).

A Comprehensive Review of Nanotechnology Applications in Oil and Gas Well Drilling Operations; Alkalbani, et al,; Energies 2024, 17, 798 pp. 1-32.

A model for evaluating relative gas permeability considering the dynamic occurrence of water in tight reservoirs; Wang, et al.; Fuel 386 (2025) 134240; pp. 1-21.

BP Energy Outlook 2035; Jan. 2014; pp. 51-64.

Towards Relative Permeability Measurements in Tight Gas Formations; E3S Web of Conferences 146, 05001 (2020); pp. 1-7.

Petrophysical and geomechanical characteristics of Canadian tight oil and liquid-rich gas reservoirs: I. Pore network and permeability characterization; A. Ghanizadeh et al. / Fuel 153 (2015) 664-681.

Gas-Water Flow Behavior in Water-Bearing Tight Gas Reservoirs; cao, et al.; Hindawi Geofluids vol. 2017, Article ID 9745795; pp. 1-16.

Study on Water Displacing Gas Relative Permeability Curves in Fractured Tight Sandstone Reservoirs Under High Pressure and High Temperature; Du, et al.; ACS Omega 2020, 5, 7456-7461.

Performance evaluation on water-producing gas wells based on gas & water relative permeability curves: A case study of tight sandstone gas reservoirs in the Sulige gas field, Ordos Basin; Yuegang, et al.; Natural Gas Industry B 3,(2016) 52-58.

Tight Gas Reservoirs: Evaluation; AAPG Wiki. (Retrieved from http://wiki.aapg.org/index.php?title=Tight_gas_reservoirs:_evaluation &oldid=28397).

Tight Gas Sandstone Reservoirs, Part 1: Overview and Lithofacies; Chapter 14 Y. Zee Ma et al. Unconventional Oil and Gas Resources Handbook Evaluation and Development 2016, pp. 405-427.

\* cited by examiner

Figure 2. Fluorescence spectroscopy of the quantum dots

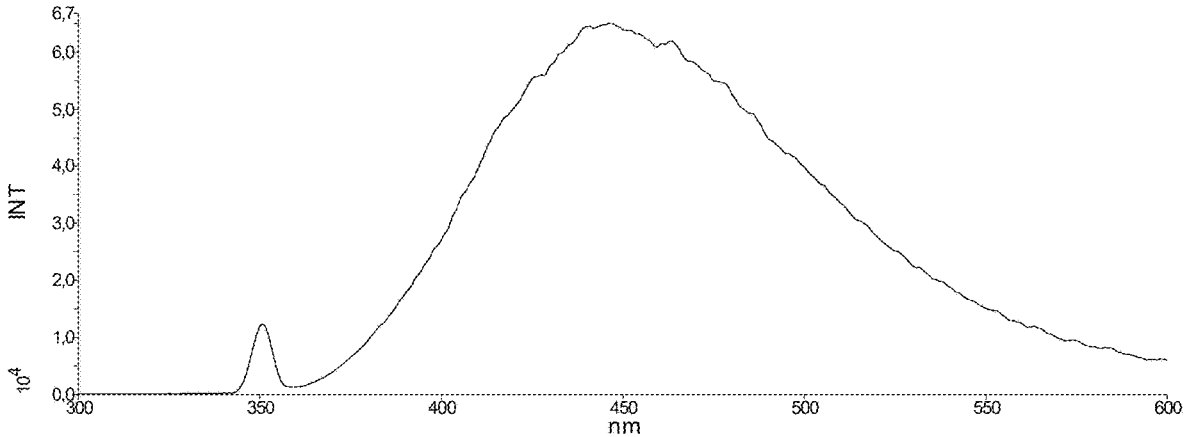
Figure 4. Fluorescence spectroscopy of the quantum dots

WATER/GAS RATIO REDUCER COMPOUNDS

FIELD OF THE INVENTION

The present invention relates to additives used in drilling fluids for providing improved drilling efficiencies in oil wells and related processes. The drilling efficiencies include an ability to stabilize clay(s) within the oil well during drilling and/or oil removal operations. In addition, the present invention relates to additives used in drilling fluids for providing improved drilling efficiencies in gas wells and related processes. More particularly, this invention relates to carbon quantum dot (CQD) compositions further comprising nickel and/or palladium nanoparticles having clay-swelling inhibition properties that enhance one or more drilling related oilfield processes. The present invention also relates to carbon quantum dot (CQD) compositions further comprising nickel and/or palladium nanoparticles having clay-swelling inhibition properties that enhance gas production, reduce water co-production and/or reduce the Kw/Kg ratio in sandstone and/or limestone formations containing gas and, optionally, water.

BACKGROUND OF THE INVENTION

As the global energy requirement to power modern technologies increases with time, increased production of existing energy feedstocks coexists with development of alternative energy sources. True costs of energy production should consider both direct production costs and the environmental costs and burdens created by the particular feedstock's energy generation. Within the fossil fuels segment of the energy market, natural gas is viewed as a cleaner source than coal or oil and thus provides an incentive to decrease direct costs as well. Thus, demand for and/or investment in the reserves of natural gas has been gradually increasing with the expansion of the natural gas market (BP's Energy Outlook 2035, (2014)); (Ghanizadeh et al., 2015).

To obtain the oil and related hydrocarbons entrapped below the earth's surface, wells are drilled into the formations, thereby contacting not only the rock formation, but also any clay contained therein. The drills require drilling fluids designed to facilitate penetration of the clay-contained rock typically carried out using a rotary drill bit within a pipe. The drilling fluids, by their very nature, may include a complex mixture of chemicals and carriers designed to address one or more functions of well drilling operations. These may include cooling and lubrication of the drill bit and/or removal of the drill's cuttings as they are formed. Some drilling fluid additives may provide stabilization to the walls of the well cut into and/or assist in providing a counterpressure to internal fluid pressures within the formation. Other additives may be added to allow the application of increased pressures within the formation as part of a fracking or fracturing process. To reduce the cost and environmental impact of drilling fluids in any of these applications, it is advantageous to recycle the fluids where possible.

Natural gas can be found in many different types of sub-surface reservoirs, including for example, sedimentary rock formations such as oil shales, limestones, sandstones and tight sandstone that may further contain or be associated with one or more layers of clay. These unconventional gas reservoirs present additional challenges for gas recovery. The gas phase is typically tightly bound to the rock structure by capillary forces and requires changing the physical properties of the reservoir (such as fracking), or changing the flow characteristics of the fluid to recover the gas.

Tight gas sandstone reservoirs have typically lower permeability and generally lower effective porosity than other more conventional sandstone reservoirs. Sandstone reservoirs with permeability lower than 0.1 milliDarcy (mD) were historically not economically producible, but advances in stimulation technology have enabled production from these tight formations. Water introduced by natural subsurface migration or as a consequence of drilling presents additional problems for total production and/or rate of production from a tight gas sandstone rock formation. Limiting water saturation in a tight sandstone gas reservoir has become a key parameter in controlling gas production (Ye, L.Y.; et al., 2015)

As compared with non-water-bearing tight gas reservoirs, the gas recovery of water-bearing tight gas reservoirs is generally lower. In many instances, water's mobility in the formation may inhibit the gas also flowing through the rock. Water moving into the small pores of the rock may reduce the capacity of the pores of the rocks to allow natural gas to flow concurrently. Under conditions of high-water flow through some gas reservoirs, the capacity of the wells to produce gas may be significantly and/or adversely affected.

One of the influencing factors is the gas-water relative permeability, which may be adversely impacted by variations in drawdown pressure (Cao, R. Y.; et al, 2017). Especially in scenarios involving external fluid invasion, the damage rate of water to gas permeability can range from 60% to 90% (Wang, Zechuan et al 2025). Thus, understanding and assessing the level and impact of water on gas permeability in any tight gas sandstone reservoir is of paramount importance to both production and production rate during gas recovery. Generally speaking, Kw/Kg ratio is an indicator of relative mobility of water and gas in a reservoir containing oil and/or other related hydrocarbons, including, for example, natural gas. Typically, a gas well having a high Kw/Kg ratio (for example, greater than 1) will produce more water than gas, thereby reducing gas production rate and increasing costs.

Certain underground reservoirs of oil and/or gas reserves are located in sedimentary rock formations that may further contain clay particles within the rock particle spaces and/or one or more layers of clays. Sedimentary rock formations include those containing, for example sandstone and/or limestone. Clays contained in sedimentary rocks include, for example, one or more of smectites, montmorillonites, illites, micas, kaolinites and/or chlorites.

A clay's characteristics arise from its chemical composition, layered structure, and size. Generally speaking, clay minerals have a great affinity for water. As a clay adsorbs water within its structure, it expands or "swells." (Karpinski, 2015; Chen et al., 2022). Thus, contact of a clay layer with any water can affect the integrity and/or the productivity of an oil well and/or gas well. For example, water introduction into the clay during drilling and consequent clay swelling may permit dispersion of clay cuttings into a drilling fluid or recovered oil and render it difficult to remove by simpler and more cost-effective means. Clay swelling can also lead to wall instability in the well. There are other situations where swelling and disintegration of clay particulate matter can cause problems in water containing fluids. For example, clay-containing fines present in fracturing fluids comprising water may swell and become dispersed, which impairs fluid flow and makes the clay difficult to remove, preventing re-use or partial recycling of the fluids. But these have been replaced by water-based drilling fluids in efforts to reduce environmental and economic impacts.

It is therefore highly desirable to provide further additives for water-containing drilling fluids which reduce clay swelling and/or disintegration of clay containing cuttings. However, the introduction of water-based fluids into well drilling operations increases the potential for clay hydration and swelling. (Muhammed et al., 2021).

Traditionally, inhibition of clay swelling resulting from water-based drilling fluids was achieved using high concentrations of potassium chloride in the water-based fluids. However high treat rates of 3 to 7 wt % are needed which can affect the consistency of the drilling fluid and increase costs (including costs associated with disposal of fluids that contain high contents of potassium chloride). In addition, more recent studies have identified adverse environmental impacts of high concentrations of aqueous potassium chloride against some species of salmonid fish. (Densmore et al., USGS 2018).

Certain amines have been employed as alternatives to potassium chloride, with ammonium ions functioning in a similar way to potassium ions. (Horton, et al., U.S. Pat. No. 5,771,971) However, one of the problems with these additives is that they are only compatible with acidic fluids. In an attempt to overcome the need for an acidic environment, some quaternary ammonium salts have been disclosed as alternatives to amines as clay swelling inhibitors. (Murtaza, et al. 2020); (Aften et al., U.S. Pat. No. 5,342,530); Smith et al., U.S. Pat. No. 7,915,202).

More recently, the search for water-based fluid additives has focused on nanoparticles and their potential impact on drilling fluid thermal and filtration properties as well as their possible effects on rheology, fluid loss control and mud cake thickness. (Cheraghian, 2021). A range of different types of nano-additives, including polymer, ceramic, clay, silica, metal oxide, carbon-based and metal nanoparticles have been examined for impacts on one or more drilling fluid performance properties, such as their mechanical or thermal properties and wellbore stability. In some instances, nanoparticles have been postulated to reduce the cost and levels of materials in use, improve the ability to drill in challenging formations, decrease non-productive well downtime, or increase oil recovery, any of which might provide environmental and/or economic benefits in oilfield application.

Therefore, new and better clay swelling inhibitors for use within aqueous drilling fluids are needed that can reduce clay swelling, have higher penetration rates than oil-based fluids, are more environmentally acceptable, employable at much lower concentrations, are reusable, may be used in a wider range of drilling fluids including, for example, seawater-based drilling fluids and/or more cost-effective in use are extremely desirable. In addition, new and better clay stabilizing compounds for use within aqueous drilling fluids are needed that can enhance gas production, reduce water co-production in sandstone, tight sandstone and/or limestone gas reservoirs and/or reduce the Kw/Kg ratio in limestone, sandstone and/or tight sandstone formations containing gas and water and/or more cost-effective in use are also extremely desirable. The present invention is directed to these and other important ends.

SUMMARY OF THE INVENTION

Accordingly, the present invention is directed, in part, to clay stabilizing compounds consisting essentially of a metal-doped carbon quantum dot; wherein the metal species consists essentially of a Ni or Pd species or combination of Ni and Pd species, and optionally, a carbon quantum dot-metal ligand linker thereof.

In some embodiments, the present invention is directed, in part, to clay swelling inhibitor compounds consisting essentially of a metal-doped carbon quantum dot; wherein the metal species consists essentially of a Ni or Pd species or combination of Ni and Pd species, and optionally, a carbon quantum dot-metal ligand linker thereof.

In other embodiments, the present invention is directed, in part, to oilfield drilling fluid compositions comprising:
Water; and
a clay stabilizing compound consisting essentially of a metal-doped carbon quantum dot;
wherein the metal species consists essentially of a Ni or Pd species or combination of Ni and Pd species, and optionally, a carbon quantum dot-metal ligand linker thereof.

In yet other embodiments, the present invention is directed, in part, to methods for stabilizing clay in an oilfield drilling fluid comprising water, the method comprising adding to the oilfield drilling fluid a clay stabilizing compound consisting essentially of a metal-doped carbon quantum dot;
wherein the metal species consists essentially of a Ni or Pd species or combination of Ni and Pd species, and optionally, a carbon quantum dot-metal ligand linker thereof.

In still other embodiments, the present invention is directed, in part, to methods for stabilizing clay in an oilfield drilling fluid comprising water, the method comprising adding to the oilfield drilling fluid an oilfield drilling fluid composition comprising:
Water; and
a clay stabilizing compound consisting essentially of a metal-doped carbon quantum dot;
wherein the metal species consists essentially of a Ni or Pd species or combination of Ni and Pd species, and optionally, a carbon quantum dot-metal ligand linker thereof.

In other embodiments, the present invention is directed, in part, to methods for stabilizing clay in an oilfield drilling fluid, wherein the addition of the clay stabilizing compound disclosed hereinabove increases the clay stabilization of the oilfield drilling fluid.

In other embodiments, the present invention is directed, in part, to methods for stabilizing clay in an oilfield drilling fluid, wherein the addition of the drilling fluid composition disclosed hereinabove increases the clay stabilization of the oilfield drilling fluid.

In yet other embodiments, the present invention is directed, in part, use of a clay stabilizing compound consisting essentially of a metal-doped carbon quantum dot; wherein the metal species consists essentially of a Ni or Pd species or combination of Ni and Pd species, and optionally, a carbon quantum dot-metal ligand linker thereof as a clay swelling inhibitor in an oilfield drilling operation.

In some other embodiments, the present invention is directed, in part, to use of an oilfield drilling fluid composition comprising:
Water; and
a clay stabilizing compound consisting essentially of a metal-doped carbon quantum dot;
wherein the metal species consists essentially of a Ni or Pd species or combination of Ni and Pd species, and optionally, a carbon quantum dot-metal ligand linker thereof as a clay swelling inhibitor in an oilfield drilling operation.

In still other embodiments, the clay stabilizing compound as described herein throughout has advantageous properties that can assist in reducing the water/gas production ratio in the output of certain gas wells, especially those gas wells comprising any sandstone or limestone rock formation.

Accordingly, in some embodiments, the present invention is directed, in part, to use of a clay stabilizing compound, as described herein, said clay stabilizing compound also having water/gas production ratio reducing properties, as a water/gas ratio reducer compound in a gas well operation, the water/gas ratio reducer compound consisting essentially of a metal-doped carbon quantum dot; wherein the metal species consists essentially of a Ni or Pd species or combination of Ni and Pd species, and optionally, a carbon quantum dot-metal ligand linker thereof.

In other embodiments, the present invention is directed, in part, to gas well drilling fluid compositions comprising:

Water; and a water/gas ratio reducer compound consisting essentially of a metal-doped carbon quantum dot;

wherein the metal species consists essentially of a Ni or Pd species or combination of Ni and Pd species, and optionally, a carbon quantum dot-metal ligand linker thereof.

In certain other embodiments, the present invention is directed, in part, to use of a gas well drilling fluid composition, as described herein, as a water/gas ratio reducer composition in gas well drilling operations said water/gas ratio reducer composition comprising:

Water; and a water/gas ratio reducer compound consisting essentially of a metal-doped carbon quantum dot;

wherein the metal species consists essentially of a Ni or Pd species or combination of Ni and Pd species, and optionally, a carbon quantum dot-metal ligand linker thereof as a water/gas ratio reducer in a gas well operation.

In yet other embodiments, the present invention is directed to methods for upgrading gas/water output from a gas well reservoir, said reservoir comprising sandstone or limestone, the method comprising:

contacting the reservoir with a water/gas ratio reducer compound for a time and under conditions sufficient to increase the amount of gas relative to the amount of water in the gas well reservoir output as expressed by the output's water permeability (Kw)/gas permeability (Kg) ratio;

wherein the water/gas ratio reducer compound consists essentially of a metal-doped carbon quantum dot wherein the metal-doped carbon quantum dot's metal species consists essentially of a Ni or Pd species or combination of Ni and Pd species, and optionally, a carbon quantum dot-metal ligand linker thereof.

In still other embodiments, the present invention is directed to methods for upgrading gas/water output from a gas well reservoir, said reservoir comprising sandstone or limestone, the method comprising:

contacting the reservoir with a water/gas ratio reducer composition for a time and under conditions sufficient to increase the amount of gas relative to the amount of water in the gas well reservoir output as expressed by the output's water permeability (Kw)/gas permeability (Kg) ratio; the water/gas ratio reducer composition comprising:

Water; and a water/gas ratio reducer compound consisting essentially of a metal-doped carbon quantum dot;

wherein the metal species consists essentially of a Ni or Pd species or combination of Ni and Pd species, and optionally, a carbon quantum dot-metal ligand linker thereof as a water/gas ratio reducer compound in the gas well reservoir.

The foregoing and other objectives, features, and advantages of the invention will be more readily understood upon consideration of the following detailed description of the invention.

BRIEF DESCRIPTION OF THE DRAWINGS

FIG. 4 shows the fluorescence spectrum of Ni-doped carbon quantum dots obtained in Example 4.

DETAILED DESCRIPTION OF ILLUSTRATIVE EMBODIMENTS

Figure 1:
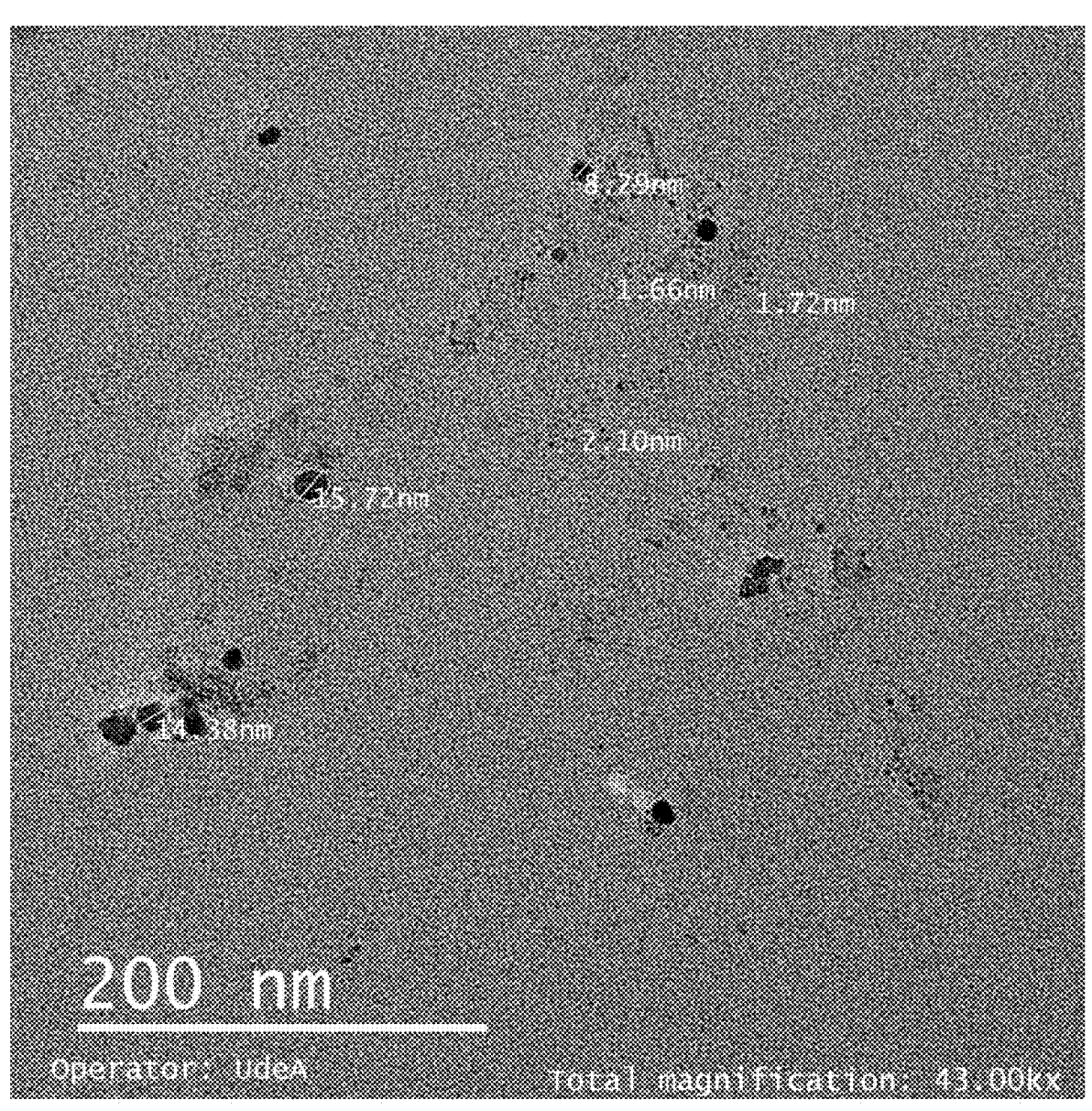
FIG. 1 shows the Transmission Electron Microscopy image of Pd-doped carbon quantum dots obtained in Example 1.

As employed above and throughout the disclosure of the present invention, the following terms, unless otherwise indicated, shall be understood to have the following meanings.

As used herein, the term "nanoparticle" refers to fine particles having a particle size of less than or equal to 100 nanometers (i.e., less than or equal to 0.1 μm)

As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

As used in the specification and the appended claims, the singular forms "a", "an," and "the" include both singular and plural referents unless the context clearly dictates otherwise.

As used herein, the term "and/or," when used in a list of two or more items, means that any one of the listed items can be employed by itself or any combination of two or more of the listed items can be employed. For example, if a list is described as comprising group A, B, and/or C, the list can comprise A alone; B alone; C alone; A and B in combination; A and C in combination, Band C in combi-nation; or A, B, and C in combination.

Throughout this specification, the term "comprising" or "comprises" means including the component(s) specified but not to the exclusion of the presence of other components.

As used, herein, the term "carbon quantum dot-metal ligand linker" refers to one or more atoms in a chain wherein one terminus of the chain is attached to functionality that is part of the carbon quantum dot structure and the other terminus is associated with the metal species. For example, the functionality that is part of the carbon quantum dot structure may be a pendant carboxylic acid group. Thus, one of the two functional groups (OH and NH2) on monoethanolamine may react with the carboxylic acid group to form a covalent ester or amide linage, respectively. The other functional group would be available to associate with the metal species, typically ionically, covalently or coordinatively attached creating a bridge, indirectly connecting the metal species to the carbon quantum dot. In the absence of a linker ligand, the metal species may be deposited directly onto the carbon quantum dot, or directly and typically ionically, covalently or coordinatively attach itself to functionality that is a part of the carbon quantum dot structure.

As used herein, the term "clarified fruit juice" is typically an amount of juice that is prepared by crushing a fruit containing citric acid and one or more fruit sugars that is thereafter filtered to remove cellular material by means known to those in the art.

As used herein, the term "water/gas ratio reducer compound" refers a clay stabilizing compound or clay swelling inhibitor compound, either as described herein throughout, that also has water/gas production ratio reducing properties concerning output or productions of water/gas streams from gas well operations. Accordingly, the term "water/gas ratio reducer composition refers independently to either of a clay stabilizing composition and/or clay swelling inhibitor composition, either as described herein throughout, and includes at least one "water/gas ratio reducer compound."

As used herein, the term "gas" refers to "natural gas", which is generally defined as a flammable gas, consisting largely of methane and other hydrocarbons, occurring naturally underground (often in association with petroleum) and used as fuel.

As used herein, a "gas well reservoir" and "gas reservoir" each independently refer to a rock formation comprising limestone and/or sandstone, preferably sandstone, more preferably tight sandstone, optionally having a clay mineral or clay layer, as defined herein, associated with the gas well reservoir.

As used herein, the term "tight gas reservoir" refers to a gas reservoir with estimated in situ gas permeability of 00.1 md (millidarcy) or less as officially recognized by the U.S. Federal Energy Regulatory Commission. These low permeability gas-bearing formations occur in almost all gas-producing sedimentary basins worldwide, and include, for example, tight gas sandstones and water-bearing tight sandstone reservoirs.

As used herein, the term "porosity" refers to level of empty space in a soil or rock between the particles.

As used herein, the term "permeability" refers to how easily a fluid can move through the material.

As used herein, the term "Kw" refers to the effective permeability of water through the rock as a single fluid, and the term "Kg" refers to the effective permeability of natural gas through the rock as a single fluid. The ratio "Kw/Kg" refers to the relative measure of how water flows through a rock as compared with how natural gas flows through the same material. Comparing the effective permeabilities of water and gas through untreated cores and cores pretreated with a Kw/Kg ratio reducer compound gives rise to an modified Kw/Kg ratio reflective of how effective the Kw/Kg ratio reducer compound will be at increasing the level of natural gas relative to water in the well output.

As used herein, the term "water-bearing" refers to sedimentary rock formations that contain connate water or interstitial water in the spaces between the rock particles within the rock. The term "connate" refers to water trapped when the sediments initially formed. In some cases, the water is saline and//or has trapped minerals. The term interstitial" refers to water that migrates into the pores of the sedimentary rock after the sedimentary rock was formed. In some embodiments of the present invention, the rock formation may be water-bearing. In other embodiments, the rock formation may have water introduced during the drilling, fracking and/or a process where a Kw/Kg ratio reducer compound in introduced into the well.

The invention illustratively disclosed herein suitably may be practiced in the absence of any element which is not specifically disclosed herein. The invention illustratively disclosed herein suitably may also be practiced in the absence of any element which is not specifically disclosed herein and that does not materially affect the basic and novel characteristics of the claimed invention.

When ranges are used herein for physical properties, such as molecular weight, particle size, or chemical properties, such as chemical formulae, contacting times of reagents, pressures, temperatures, and drying times, all combinations and subcombinations of ranges and specific embodiments therein are intended to be included.

As used herein, unless otherwise expressly specified, all numbers such as those expressing values, ranges, amounts of percentages may be read as if prefaced by the word "about", even if the term does not expressly appear.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

The optional features set out herein may be used either individually or in combination with each other where appropriate and particularly in the combinations as set out in the accompanying claims. The optional features for each exemplary aspect of the invention, as set out herein are also applicable to any other aspects or exemplary aspects of the invention, where appropriate. In other words, the skilled person reading this specification should consider the optional features for each aspect or embodiment of the invention as interchangeable and combinable between different aspects of the invention.

The disclosures of each patent, patent application and publication cited or described in this document are hereby incorporated herein by reference, in their entirety.

This invention is directed to, inter alia, the surprising and unexpected discovery of a new class of clay stabilizing compounds and compositions containing clay stabilizing compounds.

This invention is further directed to, inter alia, to processes for their preparation of clay stabilizing compounds and compositions containing clay stabilizing compounds and methods of their use.

More particularly, this invention is directed, in part, to clay stabilizing compounds consisting essentially of a metal-doped carbon quantum dot. Generally speaking, the compound's ability to stabilize clay or inhibit clay swelling is not typically a function of the oxidation state of the metal atom in the metal-doped quantum carbon dot. The oxidation state of the metal species is more typically dependent on whether the metal is deposited onto the carbon quantum dot, covalently attached through a functionality present at the carbon quantum dot surface, or associated with a ligand linker group that connects the metal species to the carbon quantum dot. Yet in some embodiments of the present invention, the oxidation state (valency) of the one or more attached metal species after doping is zero. In other embodiments the metal species' valency is two. In still further embodiments, the one or more attached metal species may include metal species having combination of valency states (zero and two).

Benefits of the clay stabilizing compounds and compositions containing clay stabilizing compounds of the present invention include one or more of: an ability to reduce clay swelling, have higher penetration rates than oil-based fluids, be more environmentally acceptable and/or employable at much lower concentrations, are reusable, may be used in a wider range of drilling fluids including, for example, sea-water-based drilling fluids and/or more cost-effective in use.

Accordingly, in certain embodiments, the present invention provides clay stabilizing compounds consisting essentially of a metal-doped carbon quantum dot; wherein the metal species comprises a Ni or Pd species or combination of Ni and Pd species, and optionally, a carbon quantum dot-metal ligand linker thereof. In certain preferred embodiments, the metal-doped carbon quantum dot may include one or more further metal species. In other preferred embodiments, the metal-doped carbon quantum dot as disclosed above excludes one or more of the following metal species: zinc, iron, cobalt, chromium, manganese, magnesium, copper, molybdenum, ruthenium, rhodium, silver, tungsten, rhenium, osmium, gadolinium, iridium, platinum or gold as a further metal species in the metal-doped carbon quantum dot.

In certain other embodiments, the present invention provides clay stabilizing compounds consisting essentially of a metal-doped carbon quantum dot; wherein the metal species consists essentially of a Ni or Pd species or combination of Ni and Pd species, and optionally, a carbon quantum dot-metal ligand linker thereof.

In still other embodiments, the present invention provides clay stabilizing compounds consisting essentially of a metal-doped carbon quantum dot; wherein the metal species consists of a Ni or Pd species or combination of Ni and Pd species, and optionally, with a carbon quantum dot-metal ligand linker thereof between the carbon quantum dot and the metal species.

In certain preferred embodiments of the compounds according to the invention, the metal species in the metal-doped carbon quantum dot is a nickel species. In other preferred embodiments, the metal species is a palladium species. In still other preferred embodiments, the metal species is a combination of nickel and palladium species on a carbon quantum dot, or alternatively a mixture of nickel-doped quantum dots and palladium-doped quantum dots. In some preferred embodiments, the metal species is deposited directly onto the carbon quantum dot. In other preferred embodiments, the metal species is covalently, ionically or coordinatively attached to a functionality present at the surface of the carbon quantum dot.

In certain other preferred embodiments, the metal and the carbon quantum dot are linked together by a ligand that indirectly connects the metal species and the carbon quantum dot. The ligand linker is attached at one end of its chain structure to the carbon quantum dot, typically covalently through a functionality at the surface of the carbon quantum dot. The other terminus of the ligand may be connected to the metal through a coordinate bond, for example, a metal chelating functionality, or through a covalent or ionic bond, as one of ordinary skill in the art would readily appreciate.

In certain preferred embodiments, the metal-doped carbon quantum dot has a fluorescence emission maximum from about 425 nm to about 500 nm. In other preferred embodiments, the metal-doped carbon quantum dot has a fluorescence emission maximum from about 425 nm to about 475 nm. In yet other preferred embodiments, the particle size of the metal-doped carbon quantum dot is in a range of from about 1 nm to about 15 nm, characterized by transmission electron microscopy.

In some preferred embodiments, the clay stabilizing compounds are provided as oilfield drilling fluid compositions comprising the clay stabilizing compound disclosed herein-above and water. In other preferred embodiments, the compositions further comprise a co-solvent. In some preferred embodiments, the co-solvent is a glycol. In certain embodiments the glycol is an alkylene glycol, more preferably an ethylene glycol. Non-limiting examples include monoethylene glycol and diethylene glycol.

Some other preferred embodiments of oilfield drilling fluid compositions the water includes fresh water, seawater, or a combination of fresh water and seawater. Any of these compositions may be advantageously employed in or added to aqueous drilling fluids known in the art.

In some embodiments, the invention is directed to processes for preparing a clay stabilizing compound consisting essentially of a metal-doped carbon quantum dot; wherein the metal species consists essentially of a Ni or Pd species or combination of Ni and Pd species, and optionally, a carbon quantum dot-metal ligand linker thereof:

said process comprising:

microwave irradiating a clarified fruit juice containing citric acid and a sugar for a time and under conditions effective to prepare a carbon quantum dot containing material;

combining a nickel or palladium salt and monoethanolamine with the material; and heating the combined material using induction heating for a time and under conditions effective to prepare the metal-doped carbon quantum dot.

In certain embodiments, the invention is directed to methods for stabilizing clay in an oilfield drilling fluid comprising water, the method comprising adding to the oilfield drilling fluid a clay stabilizing compound comprising a metal-doped carbon quantum dot, preferably wherein the metal-doped carbon quantum dot is as disclosed herein-above.

In certain other embodiments, the invention is directed to methods for stabilizing clay in an oilfield drilling fluid comprising water, the method comprising adding to the oilfield drilling fluid a drilling fluid composition comprising water and a metal-doped carbon quantum dot, preferably wherein the water and the metal-doped carbon quantum dot are each independently as disclosed hereinabove.

In some preferred embodiments of the methods of the present invention, the addition of a clay stabilizing compound as disclosed herein to an oilfield drilling fluid increases the clay stabilization of the oilfield drilling fluid.

In yet other preferred embodiments of the methods of the present invention, the addition of a drilling fluid composition as disclosed herein to an oilfield drilling fluid increases the clay stabilization of the oilfield drilling fluid.

Once armed with the disclosures provided herein, the skilled artisan will be able to appreciate and employ to great advantage the metal-doped carbon quantum dots and their compositions, methods, techniques and processes disclosed herein for use within aqueous drilling fluids that can reduce clay swelling, have higher penetration rates than oil-based fluids, are more environmentally acceptable, employable at much lower concentrations, are reusable, may be used in a wider range of drilling fluids including, for example, seawater-based drilling fluids and/or more cost-effective in use are extremely desirable.

This invention is directed to, inter alia, the surprising and unexpected discovery of a new class of water/gas ratio reducer compounds and compositions containing water/gas ratio reducer compounds.

This invention is further directed to, inter alia, processes for the preparation of water/gas ratio reducer compounds and compositions containing water/gas ratio reducer compounds and methods of their use in gas wells.

More particularly, this invention is directed, in part, to water/gas ratio reducer compounds consisting essentially of a metal-doped carbon quantum dot. Generally speaking, the compound's ability to reduce the water/gas ratio in gas well output is not typically a function of the oxidation state of the metal atom in the metal-doped quantum carbon dot. The oxidation state of the metal species is more typically dependent on whether the metal is deposited onto the carbon quantum dot, covalently attached through a functionality present at the carbon quantum dot surface, or associated with a ligand linker group that connects the metal species to the carbon quantum dot. Yet in some embodiments of the present invention, the oxidation state (valency) of the one or more attached metal species after doping is zero. In other embodiments the metal species' valency is two. In still further embodiments, the one or more attached metal species may include metal species having combination of valency states (zero and two).

Benefits of the water/gas ratio reducer compounds and compositions containing water/gas ratio reducer compounds of the present invention include one or more of: an ability to reduce water permeability and/or increase gas permeability in gas well reservoirs comprising sandstone and/or limestone, be more environmentally acceptable and/or employable at much lower concentrations, are reusable, may be used in a wider range of drilling fluids including, for example, seawater-based drilling fluids and/or more cost-effective in use.

Accordingly, in certain embodiments, the present invention provides water/gas ratio reducer compounds consisting essentially of a metal-doped carbon quantum dot; wherein the metal species comprises a Ni or Pd species or combination of Ni and Pd species, and optionally, a carbon quantum dot-metal ligand linker thereof. In certain preferred embodiments, the metal-doped carbon quantum dot may include one or more further metal species. In other preferred embodiments, the metal-doped carbon quantum dot as disclosed above excludes one or more of the following metal species: zinc, iron, cobalt, chromium, manganese, magnesium, copper, molybdenum, ruthenium, rhodium, silver, tungsten, rhenium, osmium, gadolinium, iridium, platinum or gold as a further metal species in the metal-doped carbon quantum dot.

In certain other embodiments, the present invention provides water/gas ratio reducer compounds consisting essentially of a metal-doped carbon quantum dot; wherein the metal species consists essentially of a Ni or Pd species or combination of Ni and Pd species, and optionally, a carbon quantum dot-metal ligand linker thereof.

In still other embodiments, the present invention provides water/gas ratio reducer compounds consisting essentially of a metal-doped carbon quantum dot; wherein the metal species consists of a Ni or Pd species or combination of Ni and Pd species, and optionally, with a carbon quantum dot-metal ligand linker thereof between the carbon quantum dot and the metal species.

In certain preferred embodiments of the compounds according to the invention, the metal species in the metal-doped carbon quantum dot is a nickel species. In other preferred embodiments, the metal species is a palladium species. In still other preferred embodiments, the metal species is a combination of nickel and palladium species on a carbon quantum dot, or alternatively a mixture of nickel-doped quantum dots and palladium-doped quantum dots. In some preferred embodiments, the metal species is deposited directly onto the carbon quantum dot. In other preferred embodiments, the metal species is covalently, ionically or coordinatively attached to a functionality present at the surface of the carbon quantum dot.

In certain other preferred embodiments, the metal and the carbon quantum dot are linked together by a ligand that indirectly connects the metal species and the carbon quantum dot. The ligand linker is attached at one end of its chain structure to the carbon quantum dot, typically covalently through a functionality at the surface of the carbon quantum dot. The other terminus of the ligand may be connected to the metal through a coordinate bond, for example, a metal chelating functionality, or through a covalent or ionic bond, as one of ordinary skill in the art would readily appreciate.

In certain preferred embodiments, the metal-doped carbon quantum dot has a fluorescence emission maximum from about 425 nm to about 500 nm. In other preferred embodiments, the metal-doped carbon quantum dot has a fluorescence emission maximum from about 425 nm to about 475 nm. In yet other preferred embodiments, the particle size of the metal-doped carbon quantum dot is in a range of from about 1 nm to about 15 nm, characterized by transmission electron microscopy.

In some preferred embodiments, the water/gas ratio reducer compounds are provided as gas well drilling fluid compositions comprising the water/gas ratio reducer compound disclosed hereinabove and water. In other preferred embodiments, the compositions further comprise a co-solvent. In some preferred embodiments, the co-solvent is a glycol. In certain embodiments the glycol is an alkylene glycol, more preferably an ethylene glycol. Non-limiting examples include monoethylene glycol and diethylene glycol. In some other preferred embodiments, the co-solvent is an alkoxyalkanol, more preferably a C1-C6 alkoxyalkanol still more preferably an C1-C6 alkoxyethanol. Non-limiting examples include 2-(n-butoxy)ethanol, 2-(iso-butoxy)ethanol, and 2-(t-butoxy)ethanol.

Some other preferred embodiments of gas well drilling fluid compositions the water includes fresh water, seawater, or a combination of fresh water and seawater. Any of these compositions may be advantageously employed in or added to aqueous drilling fluids known in the art.

In some embodiments, the invention is directed to processes for preparing a water/gas ratio reducer compound consisting essentially of a metal-doped carbon quantum dot; wherein the metal species consists essentially of a Ni or Pd species or combination of Ni and Pd species, and optionally, a carbon quantum dot-metal ligand linker thereof:

said process comprising:

microwave irradiating a clarified fruit juice containing citric acid and a sugar for a time and under conditions effective to prepare a carbon quantum dot containing material;

combining a nickel or palladium salt and monoethanolamine with the material; and heating the combined material using induction heating for a time and under conditions effective to prepare the metal-doped carbon quantum dot.

A method for upgrading gas/water output from a gas well reservoir, said reservoir comprising sandstone or limestone, the method comprising:

contacting the reservoir with a water/gas ratio reducer compound for a time and under conditions sufficient to increase the amount of gas relative to the amount of water in the gas well reservoir output as expressed by the output's water permeability (Kw)/gas permeability (Kg) ratio;

wherein the water/gas ratio reducer compound consists essentially of a metal-doped carbon quantum dot wherein the metal-doped carbon quantum dot's metal species consists essentially of a Ni or Pd species or combination of Ni and Pd species, and optionally, a carbon quantum dot-metal ligand linker thereof.

The upgrading down well may take place in the following fashion. This general upgrading procedure may be employed after a well has been drilled and completed, whether or not the well is currently in production. Prior to introducing the water/gas ratio reducer compound or composition into the well, it is useful if the well is perforated within the target zones that contain the natural gas. A volume of treatment fluid containing the water/gas ratio reducer compound or composition is calculated, based on a radial volume of usually 5-25 feet surrounded the well bore in the target zone, preferably 7-15 feet. This volume is calculated for the effective pore volume based on the rock reservoir porosity. The calculated pore volume also takes into account the interval length in the producer zone. A specific length of the interval zone is not critical to the practice of the invention, as the technology will work for any interval length. To pump the fluid into the well, it is advantageous to use a coiled tubing that runs through the well head and into position near the front of the perforations of target zone (pay zone) in the reservoir. Then, the fluid containing the water/gas ratio reducer compound or composition is injected or squeezed into the well by a capillary string or through use of a coiled tube and flows through the perforations into the target zones at a pressure higher than the formation pressure. Other methods are recognized by the skilled artisan. As used herein, the term "coiled tubing" or "coiled tube" refers to a continuous length of steel or composite tubing that is flexible enough to be wound on a large reel for transportation. The coiled tubing unit is typically composed of a reel with the coiled tubing, an injector, control console, power supply and well-control stack. The coiled tubing is injected into the existing production string, unwound from the reel and inserted into the well". Target formations (called pay zones or target zones) absorb the fluid as it is being injected. The pumping rate is set so as not to reach or exceed the formation fracture pressure, a characteristic defined by the geology of the individual well. Once the volume of the fluid has been squeezed into the formation, injection ceases and the well is maintained for a period of time ("soaking") in a static condition (no fluids removal) to allow the desired reaction to take place. An exemplary time for "soaking" is overnight. In other embodiments, the soaking time is in the range of from about 4 hours to about 24 hours, preferably from about 12 to about 24 hours. During this time, the water/gas ratio reducer compound or composition is in contact with the natural gas in the formation at the temperature and pressure that are defined by the well itself. After sufficient time has been allowed for the soaking, the well is reopened and fluids from the target zones (pay Zone) begin to flow back to the surface. In certain preferred embodiments, the well is retreated with additional the water/gas ratio reducer compound or composition after a time, preferably from about a few months after the most recent treatment to about a year, or even more after the most recent treatment with the water/gas ratio reducer compound or composition of the present invention. As the ordinarily skilled artisan in the art would readily recognize, the operator would use his judgment based on the specifics of the particular well in question, along with the time of return of investment based on the incremental production of natural gas or the reduction in costs of disposal of produced water, for example. In some embodiments, the gas reservoir has a porosity in the range of from about 0.1% to about 20%. Porosity or pore space volume is typically determined using a helium pycnometer to determine the solid portion of a sample using the principle for ideal gases of Boyle's Law (P1V1=P2V2) and helium gas, which quickly penetrates small pores and is nonreactive. The core is placed in a sample chamber of known volume. A reference chamber, also of known volume, is pressurized. The two chambers are then connected, allowing the helium gas to flow from the reference chamber to the sample chamber. The ratio of the initial and final pressures is used to determine the volume of the sample solid. The pore volume is the difference between the total volume and the solid volume as determined by the helium pycnometer.

In certain preferred embodiments, the porosity is in a range of from about 0.1% to about 8%.

In other embodiments, the value of the Kw/Kg ratio for the untreated well is in the range of from about 0.2 to about 5, more typically from about 0.4 to about 2. In certain embodiments, given operating criteria such as operating costs, water reinjection and/or environmental regulations, the value may be in the range of from about 0.5 to about 1.5. While these ranges may be preferred in some instances, there are other influencing factors that may broaden or reduce the ranges. For example, a well with a ratio greater than 1 or even greater than 1.5 or 2 may be of practical import, because in some countries the necessity of sufficient natural gas supplies may dictate that production in those wells be maintained for strategic purposes. Typically though, any well with an initial Kw/Kg ratio (before treatment) greater than 1.0 would be a good candidate for either treatment or retreatment with a water/gas ratio reducer compound or composition of the present invention In certain embodiments, the invention is directed to methods for reducing the water/gas ratio in gas well output with a gas well drilling fluid comprising water, the method comprising adding to the gas well drilling fluid a water/gas ratio reducer composition comprising a metal-doped carbon quantum dot, preferably wherein the metal-doped carbon quantum dot is as disclosed hereinabove.

In certain other embodiments, the invention is directed to methods for increasing gas permeability in a sandstone and/or limestone gas well reservoir with a gas well drilling fluid comprising water, the method comprising adding to the sandstone and/or limestone gas well reservoir a gas well drilling fluid composition comprising water and a metal-doped carbon quantum dot, preferably wherein the water and the metal-doped carbon quantum dot are each independently as disclosed hereinabove.

In certain other embodiments, the invention is directed to methods for decreasing water permeability in a sandstone and/or limestone gas well reservoir with a gas well drilling fluid comprising water, the method comprising adding to the sandstone and/or limestone gas well reservoir a gas well drilling fluid composition comprising water and a metal-doped carbon quantum dot, preferably wherein the water and the metal-doped carbon quantum dot are each independently as disclosed hereinabove.

In some preferred embodiments of the methods of the present gas well invention, the addition of a water/gas ratio reducer compound as disclosed herein to a gas well drilling fluid introduced into a gas well, preferably a water-bearing gas well, reduces the water/gas ratio of the gas well's output.

In some preferred embodiments of the methods of the present invention, the addition of a water/gas ratio reducer compound as disclosed herein to a gas well drilling fluid introduced into a gas well, preferably a water-bearing gas well, decreases water permeability in the gas well.

In some preferred embodiments of the methods of the present invention, the addition of a water/gas ratio reducer compound as disclosed herein to a gas well drilling fluid introduced into a gas well increases gas permeability in the gas well.

Once armed with the disclosures provided herein, the skilled artisan will be able to appreciate and employ to great advantage the metal-doped carbon quantum dots and their compositions, methods, techniques and processes disclosed herein for use within aqueous drilling fluids that can, enhance gas production, reduce water co-production in tight sandstone gas reservoirs and/or reduce the Kw/Kg ratio in tight sandstone formations containing gas and water and/or more cost-effective in use are also extremely desirable.

The present invention is further described in the following examples. Except where specifically noted, the examples are actual examples. These examples are for illustrative purposes only, and are not to be construed as limiting the appended claims.

EXPERIMENTAL SECTION

EXAMPLES OF THE PRESENT INVENTION

Example 1

Preparation of Carbon Quantum Dots (CQD)

Cape Gooseberry citrus (*Physalis peruviana,* 2000 grams) from a local market in Rio Negro Antioquia was crushed in a juice extractor (Oster model 3169). The resultant juice was clarified by filtration with a Tecnal Filtration Apparatus (0.22 um pore size filter). The clarified juice was analyzed for total sugars content and citric acid content (7.61 g of total sugars/100 mL juice, and 1.30 g citric acid/100 mL juice). The clarified juice (800 grams) was microwaved for 270 minutes in an Haceb ASHM 1.1ME microwave oven at 300 watts and 2450 Mhz. The microwaved intermediate was mixed with monoethanolamine (50 grams, Merck) and Palladium nitrate dihydrate ([Pd(NO3)2 2H2O], 2 grams) sourced from Proferro Fenandez SAS[1], gently stirred and homogenized in a 316 stainless-steel vessel. The mixture was then radiated for 25 minutes in a Mini-melt Inductotherm at 2500 watts and 3000 hertz to a temperature of 120° C. The CQD was collected for further characterization.

[1] Purchased from Proferro Fernandez SAS, Calle 4, 18-220, Medellin, CO; (proferrofdzsas@gmail.co)

Example 2

Characterization of Quantum Dots:

A sample of Carbon Quantum Dots obtained in Example 1 was characterized by Transmission Electron Microscopy (FEI Tecnai F20 Super Twin TMP at a total magnification of 43 KX and a resolution of 0.14 nm. The Transmission Electron Microscopy (TEM) image of the Carbon Quantum Dots prepared in Example 1 is shown in FIG. 1. The size range of the Quantum Dot nanoparticles was from about 1 nm to about 15 nm.

Example 3

Fluorescence spectroscopy of Quantum Dots

Figure 2:
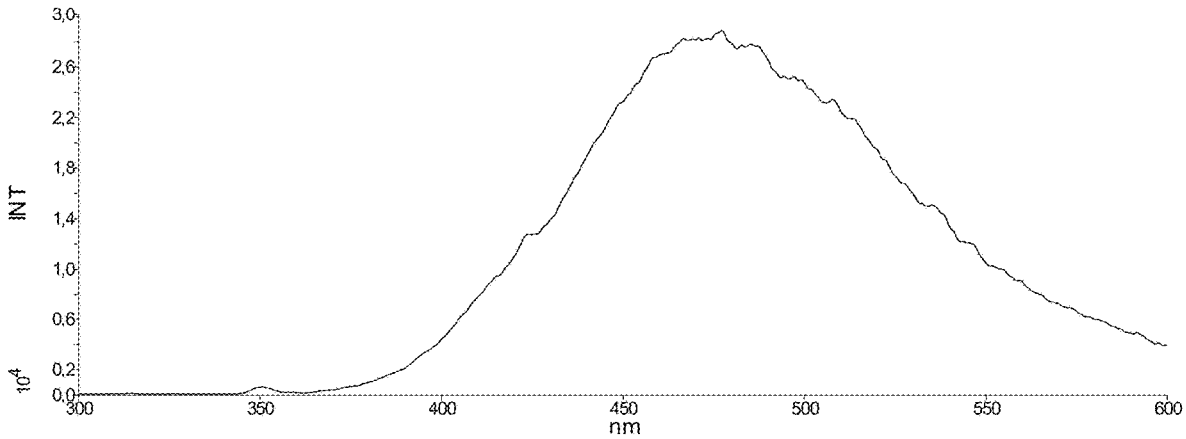
FIG. 2 shows the fluorescence spectrum of Pd-doped carbon quantum dots obtained in Example 1.

A sample of Carbon Quantum Dots (100 mg) obtained in Example 1 was poured into beaker containing deionized water (100 mL). The fluorescence spectroscopy of the prepared solution of carbon quantum dots was measured using a PerkinElmer LS-6500 Fluorescence Spectrometer. The resultant spectrum is presented in FIG. 2.

Example 4

Cape Gooseberry citrus (*Physalis peruviana,* 2000 grams from a local market in Rio Negro Antioquia was crushed in a juice extractor (Oster model 3169). The resultant juice was clarified by filtration with a Tecnal Filtration Apparatus (0.22 μm pore size filter). The clarified juice was analyzed for total sugars content and citric acid content (7.61 g of total sugars/100 mL juice, and 1.30 g citric acid/100 mL juice). The clarified juice (800 grams) was microwaved for 270 minutes in an Haceb ASHM 1.1ME microwave oven at 300 watts and 2450 Mhz. The microwaved intermediate was mixed with monoethanolamine (50 grams, Merck) and Nickel nitrate hexahydrate ([(Ni(NO3)2·6 H2O)], 2 grams) sourced from Proferro Fenandez SAS[2], gently stirred and homogenized in a 316 stainless-steel vessel. The mixture was then radiated for 25 minutes in a Mini-melt Inductotherm at 2500 watts and 3000 hertz to a temperature of 120° C. The CQD was collected for further characterization.

[2] Purchased from Proferro Fernandez SAS, Calle 4, 18-220, Medellin, CO; (proferrofdzsas@gmail.co)

Example 5

Characterization of Quantum Dots

Figure 3:
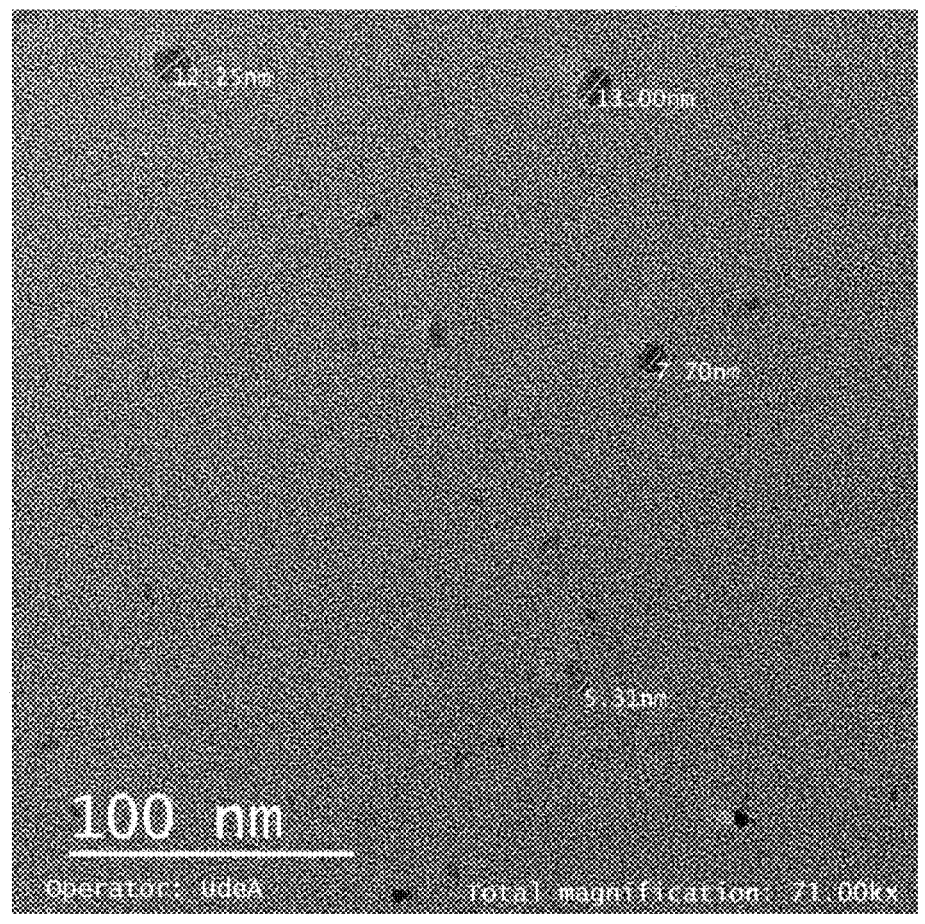
FIG. 3 shows the Transmission Electron Microscopy image of Ni-doped carbon quantum dots obtained in Example 4.

A sample of Carbon Quantum Dots obtained in Example 4 was characterized by Transmission Electron Microscopy (FEI Tecnal F20 Super Twin TMP at a total magnification of 43 KX and a resolution of 0.14 nm. The Transmission Electron Microscopy (TEM) image of the Carbon Quantum Dots prepared in Example 4 is shown in FIG. 3. The size range of the Quantum Dot nanoparticles was from about 5 nm to about 13 nm.

Example 6

Fluorescence spectroscopy of Quantum Dots

A sample of Carbon Quantum Dots (100 mg) obtained in Example 4 was poured into a beaker containing deionized water (100 mL). The fluorescence spectroscopy of the prepared solution of carbon quantum dots was measured using a PerkinElmer LS-6500 Fluorescence Spectrometer. The resultant spectrum is presented in FIG. 4.

Example 7

Dry clay samples supplied by Petrorocas[3] of smectite (40 grams), illite (17 grams), Montmorillonite (1 gram), Kaolinite (17 grams), Quartz (25 grams) were mixed together gently until homogenized and subsequently weighed into portions (2 grams) for preparing clays-tablets. The clay mixture portions were individually placed in a tablet compacter and compressed using 40 MPa of pressure and stored in a dry environment.

[3] Purchased from Gestionde Activos Petrorocas, CRA 67 No. 78-280, Bodega 103, Medellin, CO (www.petrorocas.com); ph (034) 501 7432.

Example 8

Five clay tablets obtained in example 7 were each independently measured before swelling test. The clay tablets were allowed to stand for 1 hour in one of the prepared solutions listed in Table 1 to hydrate and swell the clay. The aqueous solutions contained either deionized water or a deionized water solution having a CQD obtained in Example 1 or Example 4 at the specified loading. The swelling of each clay-tablet was measured and reported in Table 1.

[4] The expansion is expressed as a percentage of initial length before swelling, 253% signifies that the tablet was 2.53 times its pre-swelling length.

TABLE 1

| Clay Tablet | Aqueous solution | Clay Swelling % (expansion[4]) |
|---|---|---|
| # 1 | Deionized Water | 253% |
| #2 | Deionized water + 0.5% w/w Ni loaded CQD | 19.1% |
| #3 | Deionized water + 1.0% w/w Ni loaded CQD | 17% |
| #4 | Deionized water + 0.5% w/w Pd loaded CQD | 38.3% |
| #5 | Deionized water + 1.0% w/w Pd loaded CQD | 33.1% |

Five clay tablets obtained in Example 7 were each independently measured before swelling test. The clay tablets were allowed to stand for 1 hour in one of the prepared solutions listed in Table 2 to hydrate and swell the clay. The aqueous solutions contained either seawater water or a seawater solution having a CQD obtained in Example 1 or Example 4 at the specified loading. The swelling of each clay-tablet was measured and reported in Table 2.

TABLE 2

| Clay Tablet | Aqueous solution | Clay Swelling % (expansion) |
|---|---|---|
| # 6 | Seawater | 71% |
| #7 | Seawater + 0.5% w/w Ni loaded CQD | 12.7% |
| #8 | Seawater + 1.0% w/w Ni loaded CQD | 9.4% |
| #9 | Seawater + 0.5% w/w Pd loaded CQD | 32.1% |
| #10 | Seawater + 1.0% w/w Pd loaded CQD | 25.4% |

Example 9 Preparation of CQD Solution

Carbon Quantum Dots (50 mg) obtained from EXAMPLE 1 were poured into a beaker containing deionized water (5 mL) and 2-Butoxyethanol (95 mL) sourced from Brenntag-Colombia[5]. The resultant CQD solution was stirred for 15 minutes at a temperature of 25° C.

[5] Calle 50 No. 40-64Auto pista Sur Itagui-Colombia.

Example 10

A core flowing test for Gas permeability—Klinkenberg permeability (American Petroleum Institute, 1998)[6] was performed on a sandstone core sourced from Petrorocas[7] having a porosity of 5.46%, a diameter of 3.80 cm and length of 7.7 cm., The total porous volume of the core found was 4.78 cc. The effective gas permeability (Kg)—with Hydrocarbon gas on this core was determined to be 1.51 md (millidarcy). The Effective water permeability (Kw) at 0.1 cc/min using filtered seawater was then determined to be 2.26 md. Accordingly, the calculated initial Kw/Kg ratio was calculated to be 1.50.

[6] American Petroleum Institute, 1998. Recommended Practices for Core Analysis. Recommended Practice 40, 2nd ed. API, Washington, DC, pp. 6.18-6.32, February; Klinkenberg, L.J. (1941) The Permeability of Porous Media To Liquids and Gases. Drilling and Production Practice, New York, 1 Jan. 1941, API-41-200.

[7] Purchased from Gestionde Activos Petrorocas, CRA 67 No. 78-280, Bodega 103, Medellin, CO (www.petrorocas.com); ph (034) 501 7432.

The CQD solution (10 pore volumes (47.8 cc.)) from EXAMPLE 9 was then injected into The sandstone core and allowed to soak for 6 hours.

New measurements of Kg and Kw were performed on the treated core after the soak. The effective gas permeability (Kg)—of the treated core for Hydrocarbon gas was determined to be 1.63 md and the effective water permeability (Kw) at 0.1 cc/min using filtered seawater was determined to be 1.04 md.

Accordingly, the calculated initial Kw/Kg ratio in the treated sandstone core was calculated to be 0.64 (Table 3).

TABLE 3

| Kw/Kg Ratio | |
|---|---|
| Kw/Kg Ratio Before | 1.50 |
| Kw/Kg Ratio After Treatment | 0.64 |
| Enhancement (reduction) (%) | 57.37 |

Example 11 Hypothetical

A Gas well drilled and completed in a tight sandstone gas reservoir having a porosity of 6% is selected for treatment with a Kw/Kg ratio reducer compound because the current Kw/Kg ratio is greater than 1.0. Given the well's interval length of 100 feet in the production zone, the treatment parameters are designed to provide a treatment radius of ~10 ft around the specific well has a total interval length of 100 ft in the producer zone. Based on these requirements, the required volume of treatment is calculated to be 336 barrels. The treatment is pumped at a low-rate of pumping using coiled tubing equipment to avoid fracturing the sandstone. After the required volume is pumped into the formation, the well is shut down for soaking for about 12 hours. After the soaking period, the well is opened to production and the water/gas ratio is measured and recorded. The calculated Kw/Kg ratio is less than 1.0 after treatment and soaking.

Embodiment 1. A method for upgrading gas/water output from a gas well reservoir, said reservoir comprising sandstone or limestone, the method comprising:

contacting the reservoir with a water/gas ratio reducer compound for a time and under conditions sufficient to increase the amount of gas relative to the amount of water in the gas well reservoir output as expressed by the output's water permeability (Kw)/gas permeability (Kg) ratio;

wherein the water/gas ratio reducer compound consists essentially of a metal-doped carbon quantum dot wherein the metal-doped carbon quantum dot's metal species consists essentially of a Ni or Pd species or combination of Ni and Pd species, and optionally, a carbon quantum dot-metal ligand linker thereof.

Embodiment 2. A method according to Embodiment 1, wherein the gas well reservoir comprises sandstone.

Embodiment 3. A method according to Embodiment 1 or 2, wherein the gas well reservoir comprises tight sandstone.

Embodiment 4. A method according to any one of Embodiments 1, 2 and 3, wherein the tight sandstone gas reservoir is water-bearing.

Embodiment 5. A method according to any one of Embodiments 1, 2, 3 and 4, wherein the water/gas ratio reducer compound consists essentially of a metal-doped carbon quantum dot wherein the metal-doped carbon quantum dot's metal species consists essentially of a Pd species, and optionally, a carbon quantum dot-metal ligand linker thereof.

Embodiment 6. A method according to any one of Embodiments 1, 2, 3, 4 and 5, wherein the gas well reservoir optionally comprises a clay mineral or clay layer.

Embodiment 7. A method according to any one of Embodiments 1, 2, 3, 4, 5 and 6, wherein the gas well reservoir comprises a clay mineral or clay layer.

Embodiment 8. A method according to any one of Embodiments 1, 2, 3, 4, 5, 6 and 7, wherein the Kw/Kg ratio for the reservoir output decreases after a contacting of the reservoir with the water/gas ratio reducer compound.

Embodiment 9. A method according to any one of Embodiments 1, 2, 3, 4, 5, 6, 7 and 8, wherein the water permeability in the reservoir is reduced or gas permeability in the reservoir is increased after contacting the reservoir with the water/gas ratio reducer compound.

Embodiment 10. A method according to Embodiment 9, wherein the water permeability in the reservoir is reduced after contacting the reservoir with the water/gas ratio reducer compound.

Embodiment 11. A method according to Embodiment 9, wherein the water permeability in the reservoir is reduced and gas permeability in the reservoir is increased after contacting the reservoir with the water/gas ratio reducer compound.

Embodiment 12. A method according to any one of Embodiments 1 to 11, wherein, subsequent to said contacting, the well is maintained in a static condition for a period of time before natural gas removal is initiated.

Embodiment 13. A method according to any one of Embodiments 1 to 12, wherein the contacting does not exceed the intrinsic fracture pressure of the well.

Embodiment 14. A method according to any one of Embodiments 1 to 13, wherein the natural gas in the gas well reservoir is retreated by contacting with a water/gas ratio reducer compound for a time and under conditions sufficient to increase the amount of gas relative to the amount of water in the gas well reservoir output as expressed by the output's water permeability (Kw)/gas permeability (Kg) ratio;

wherein the water/gas ratio reducer compound consists essentially of a metal-doped carbon quantum dot wherein the metal-doped carbon quantum dot's metal species consists essentially of a Ni or Pd species or combination of Ni and Pd species, and optionally, a carbon quantum dot-metal ligand linker thereof:

Embodiment 15. A method according to any one of Embodiments 1 to 14, wherein the water/gas ratio reducer compound is introduced into the gas well reservoir as a water/gas ratio reducer composition comprising:

Water; and a water/gas ratio reducer compound consisting essentially of a metal-doped carbon quantum dot; wherein the metal species consists essentially of a Ni or Pd species or combination of Ni and Pd species, and optionally, a carbon quantum dot-metal ligand linker thereof as a water/gas ratio reducer in the gas well reservoir.

When any variable occurs more than one time in any constituent or in any formula, its definition in each occurrence is independent of its definition at every other occurrence. Combinations of substituents and/or variables are permissible only if such combinations result in stable compositions.

It is believed the chemical formulas, abbreviations, and names used herein correctly and accurately reflect the underlying compounds reagents and/or moieties. However, the nature and value of the present invention does not depend upon the theoretical correctness of these formulae, in whole or in part. Thus it is understood that the formulas used herein, as well as the chemical names and/or abbreviations attributed to the correspondingly indicated compounds, are not intended to limit the invention in any way, including restricting it to any specific form or to any specific isomer.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed:

1. A method for upgrading gas/water output from a gas well reservoir, said reservoir comprising sandstone or limestone, the method comprising:

contacting the reservoir with a water/gas ratio reducer compound for a time and under conditions sufficient to increase the amount of gas relative to the amount of water in the gas well reservoir output as expressed by the output's water permeability (Kw)/gas permeability (Kg) ratio;

wherein the water/gas ratio reducer compound consists essentially of a metal-doped carbon quantum dot;

wherein the metal-doped carbon quantum dot's metal species consists essentially of:

a Ni or Pd species or combination of Ni and Pd species; or, a Ni or Pd species or combination of Ni and Pd species and a carbon quantum dot-metal ligand linker thereof.

2. A method according to claim 1, wherein the gas well reservoir comprises sandstone.

3. A method according to claim 2, wherein the gas well reservoir comprises tight sandstone.

4. A method according to claim 3, wherein the water/gas ratio reducer compound consists essentially of a metal-doped carbon quantum dot wherein the metal-doped carbon quantum dot's metal species consists essentially of:

a Pd species, or a Pd species and a carbon quantum dot-metal ligand linker thereof.

5. A method according to claim 4, wherein the gas well reservoir further comprises a clay mineral or clay layer.

6. A method according to claim 3, wherein the gas well reservoir further comprises a clay mineral or clay layer.

7. A method according to claim 6, wherein the Kw/Kg ratio for the reservoir output decreases after a contacting of the reservoir with the water/gas ratio reducer compound.

8. A method according to claim 6, wherein the water permeability in the reservoir is reduced or gas permeability in the reservoir is increased after contacting the reservoir with the water/gas ratio reducer compound.

9. A method according to claim 6, wherein the water permeability in the reservoir is reduced after contacting the reservoir with the water/gas ratio reducer compound.

10. A method according to claim 6, wherein the water permeability in the reservoir is reduced and gas permeability in the reservoir is increased after contacting the reservoir with the water/gas ratio reducer compound.

11. A method according to claim 3, wherein the tight sandstone gas reservoir is water-bearing.

12. A method according to claim 2, wherein the water/gas ratio reducer compound consists essentially of a metal-doped carbon quantum dot wherein the metal-doped carbon quantum dot's metal species consists essentially of:
a Pd species, or
a Pd species and a carbon quantum dot-metal ligand linker thereof.

13. A method according to claim 2, wherein the gas well reservoir further comprises a clay mineral or clay layer.

14. A method according to claim 2, wherein the sandstone gas reservoir is water-bearing.

15. A method according to claim 1, wherein the water/gas ratio reducer compound consists essentially of a metal-doped carbon quantum dot wherein the metal-doped carbon quantum dot's metal species consists essentially of:
a Pd species, or
a Pd species and a carbon quantum dot-metal ligand linker thereof.

16. A method according to claim 1, wherein the gas well reservoir further comprises a clay mineral or clay layer.

17. A method according to claim 1, wherein the Kw/Kg ratio for the reservoir output decreases after a contacting of the reservoir with the water/gas ratio reducer compound.

18. A method according to claim 1, wherein the water permeability in the reservoir is reduced or gas permeability in the reservoir is increased after contacting the reservoir with the water/gas ratio reducer compound.

19. A method according to claim 1, wherein the water permeability in the reservoir is reduced after contacting the reservoir with the water/gas ratio reducer compound.

20. A method according to claim 1, wherein the water permeability in the reservoir is reduced and gas permeability in the reservoir is increased after contacting the reservoir with the water/gas ratio reducer compound.

21. A method according to claim 1, wherein the natural gas in the gas well reservoir is retreated by contacting with a water/gas ratio reducer compound for a time and under conditions sufficient to increase the amount of gas relative to the amount of water in the gas well reservoir output as expressed by the output's water permeability (Kw)/gas permeability (Kg) ratio;
wherein the water/gas ratio reducer compound consists essentially of a metal-doped carbon quantum dot;
wherein the metal-doped carbon quantum dot's metal species consists essentially of:
a Ni or Pd species or combination of Ni and Pd species; or,
a Ni or Pd species or combination of Ni and Pd species and a carbon quantum dot-metal ligand linker thereof.

22. A method according to claim 1, wherein the contacting does not exceed the intrinsic fracture pressure of the well.

23. A method according to claim 1, wherein, subsequent to said contacting, the well is maintained in a static condition for a period of time before natural gas removal is initiated.

* * * * *